US012148395B2

(12) United States Patent
Lee

(10) Patent No.: US 12,148,395 B2
(45) Date of Patent: Nov. 19, 2024

(54) DISPLAY DEVICE AND METHOD OF OPERATING THE SAME

(71) Applicant: Samsung Display Co., Ltd., Yongin-Si (KR)

(72) Inventor: Kyung-Hun Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 12 days.

(21) Appl. No.: 18/102,794

(22) Filed: Jan. 30, 2023

(65) Prior Publication Data

US 2023/0290314 A1 Sep. 14, 2023

(30) Foreign Application Priority Data

Mar. 11, 2022 (KR) ........................ 10-2022-0031007

(51) Int. Cl.
*G09G 3/3291* (2016.01)
*G09G 3/3266* (2016.01)

(52) U.S. Cl.
CPC ......... *G09G 3/3291* (2013.01); *G09G 3/3266* (2013.01); *G09G 2310/0278* (2013.01); *G09G 2320/0626* (2013.01); *G09G 2320/0666* (2013.01)

(58) Field of Classification Search
CPC .......... G09G 3/20; G09G 3/32; G09G 3/3225; G09G 3/3266; G09G 3/3291; G09G 5/02; G09G 5/10; G09G 2310/0278; G09G 2320/0233; G09G 2320/0242; G09G 2320/0247; G09G 2320/0271; G09G 2320/0626; G09G 2320/0666; G09G 2340/0435; G09G 2340/06; H04N 9/67
See application file for complete search history.

(56) References Cited

U.S. PATENT DOCUMENTS 10,839,755 B2 11/2020 Ha et al.
10,902,817 B2 1/2021 Koo et al.
2023/0162648 A1* 5/2023 Hatakenaka ............. G09G 5/36
345/694

FOREIGN PATENT DOCUMENTS

CN 110060642 A 7/2019

* cited by examiner

*Primary Examiner* — Stacy Khoo
(74) *Attorney, Agent, or Firm* — Innovation Counsel LLP

(57) ABSTRACT

Provided is a display device comprising a display panel including a plurality of pixels respectively connected to a plurality of scan lines and a plurality of data lines, a scan driver configured to scan signals to the pixels through the scan lines, a date driver configured to provide data voltages to the pixels through the data lines, and a controller configured to control the scan driver and the date driver, and including an image data processor configured to receive input image data at variable input frame frequency. Accordingly, display quality is improved because a flicker is minimized or reduced.

20 Claims, 9 Drawing Sheets

FIG. 4
350
LUMINANCE
VIFF = 240Hz
VIFF = 120Hz
TIME
LUMINANCE CORRECTION (RFREQ = 48Hz)
370
LUMINANCE
VIFF = 240Hz
VIFF = 120Hz
375
TIME
LUMINANCE CORRECTION (RFREQ = 48Hz)

DISPLAY DEVICE AND METHOD OF OPERATING THE SAME

CROSS-REFERENCE TO RELATED APPLICATION

This application claims priority from and the benefit of Korean Patent Application No. 10-2022-0031007, filed on Mar. 11, 2022, which is hereby incorporated by reference for all purposes as if fully set forth herein.

BACKGROUND

1. Field of Disclosure

The present disclosure generally relates to a display device. More particularly, the present disclosure relates to a display device capable of supporting a variable frame mode and a driving method of the same.

2. Description of the Related Art

In general, a display device displays an image at a constant frame rate (or a constant frame frequency) of 60 Hz or higher. However, the frame rate of rendering by the host processor (e.g., a graphic processing unit (GPU) or graphics card) that provides frame data to the display device may not match the frame rate (or a frame frequency) of the display device. In particular, when the host processor provides frame data for a game image that performs complex rendering to the display device, this frame rate mismatch may intensify, and a tearing phenomenon in which a boundary line is generated in an image displayed on the display device may occur due to a frame rate mismatch.

Recently, to prevent such the tearing phenomenon, a variable frame mode (e.g., free-sync mode, G-sync mode, Q-sync mode, etc.) has been developed in which a host processor provides frame data to the display device at a variable frame rate (or a variable input frame frequency). The display device supporting the variable frame mode may prevent the tearing phenomenon by displaying an image in synchronization with the variable frame rate.

However, in the display device operating in the variable frame mode, the luminance of a display panel driven at a first frame frequency and the luminance of the display panel driven at a second frame frequency different from the first frame frequency may be different from each other. Accordingly, flicker may occur when the frame frequency of the display device is changed.

SUMMARY

Embodiment provides a display device with improved display quality.

Embodiment provides a method of driving the display device.

A display device according to embodiments of the present disclosure may include a display panel including a plurality of pixels respectively connected to a plurality of scan lines and a plurality of data lines, a scan driver configured to provide scan signals to the pixels through the scan lines, a date driver configured to data voltages to the pixels through the data lines, and a controller configured to control the scan driver and the date driver, and including an image data processor configured to receive input image data at variable input frame frequency. The image data processor may determine a first correction value for correcting a luminance of the display panel according to the variable input frame frequency, determine a second correction value for correcting color coordinate values for components of the input image date to which the first correction value is reflected, and output an output image date obtained by adding the input image data to which the first correction value is reflected and the second correction value.

In an embodiment, the image data processor may determine a corrected color coordinate value for any one of the components, determine corrected color coordinate values for remaining components in response to the corrected color coordinate value for the one the component, and determine the second correction value based on the corrected color coordinate values for the one component and the remaining components.

In an embodiment, the image data processor may determine the corrected color coordinate value for the remaining components by applying a correction ratio for the one component to an original color coordinate value for the remaining components.

In an embodiment, the image data processor may determine the corrected color coordinate value for the remaining components such that a Lab color difference between the input image data to which the first correction value is reflected and the output image data in a Lab color space is minimized when the original color coordinate value of the one component is corrected with the corrected color coordinate value.

In an embodiment, the image data processor may include a first correction value determiner including a plurality of lookup tables for storing the different first correction values and configured to determine the first correction value for correcting the input image data by referring to a lookup table corresponding to the variable input frame frequency among the lookup tables, a second correction value determiner configured to converts color coordinate values of RGB components of the input image data to which the first correction value is reflected into color coordinate values of a Lab color space to determine the second correction value, and an image data corrector configured to output the output mage data.

In an embodiment, the image data processor may determine a minimum frequency as a reference frequency in a variable frequency range of the variable input frame frequency, determine a reference luminance by a luminance of the display panel at the reference frequency, and determine the first correction value based on the reference luminance corresponding to the reference frequency.

A display device according to embodiments of the present disclosure may include a display panel including a plurality of pixels respectively connected to a plurality of scan lines and a plurality of data lines, a scan driver configured to provide scan signals to the pixels through the scan lines, a date driver configured to data voltages to the pixels through the data lines, and a controller configured to control the scan driver and the date driver, and including an image data processor configured to receive input image data at variable input frame frequency. The image data processor may determine a first correction value for correcting a luminance of the display panel according to the variable input frame frequency, determine whether the luminance of the display panel is within any luminance range of a first luminance range and a second luminance range, determine a second correction value for correcting color coordinate values of components of the input image data to which the first correction value is reflected when the luminance of the display panel is within the first luminance range, and output an output image date obtained by adding the input image data to which the first correction value is reflected and the second correction value.

In an embodiment, the image data processor may determine the output image data obtained by adding the input image data and the first correction value when the luminance of the display panel falls within the second luminance.

In an embodiment, the first luminance range may be about 0.5 nit to about 4.5 nit and the second luminance range may be less than about 0.5 nit and greater than about 4.5 nit.

In an embodiment, the image data processor may determine a corrected color coordinate value for any one of the components, determine corrected color coordinate values for remaining components in response to the corrected color coordinate value for the one the component, and determine the second correction value based on the corrected color coordinate values for the one component and the remaining components.

In an embodiment, the image data processor may determine the corrected color coordinate value for the remaining components by applying a correction ratio for the one component to an original color coordinate value for the remaining components.

In an embodiment, the image data processor may determine the corrected color coordinate value for the remaining components such that a Lab color difference between the input image data to which the first correction value is reflected and the output image data in a Lab color space is minimized when the original color coordinate value of the one component is corrected with the corrected color coordinate value.

In an embodiment, the image data processor may include: a first correction value determiner including a plurality of lookup tables for storing the different first correction values and configured to determine the first correction value for correcting the input image data by referring to a lookup table corresponding to the variable input frame frequency among the lookup tables, a second correction value determiner configured to converts color coordinate values of RGB components of the input image data to which the first correction value is reflected into color coordinate values of a Lab color space to determine the second correction value, and an image data corrector configured to output the output mage data.

In an embodiment, the image data processor may determine a minimum frequency as a reference frequency in a variable frequency range of the variable input frame frequency, determine a reference luminance by a luminance of the display panel at the reference frequency, and determine the first correction value based on the reference luminance corresponding to the reference frequency.

A method of operating a display device according to embodiments of the present disclosure receiving an input image data at a variable input frame frequency, determining a first correction value for correcting a luminance of a display panel according to the variable input frame frequency, determining a second correction value for correcting color coordinate values of components of the input image data to which the first correction value is reflected, and outputting an output image date obtained by adding the input image data to which the first correction value is reflected and the second correction value.

In an embodiment, the method may further include checking a luminance of the display panel based on the input image data after receiving the input image data.

In an embodiment, the determining the second correction value may include: determining a corrected color coordinate value for any one of the components, determining corrected color coordinate values for remaining components in response to the corrected color coordinate value for the one the component, and determining the second correction value based on the corrected color coordinate values for the one component and the remaining components.

In an embodiment, the determining corrected color values for the remaining components may include: determining the corrected color coordinate value for the remaining components by applying a correction ratio for the one component to an original color coordinate value for the remaining components.

In an embodiment, the determining corrected color values for the remaining components may include: determining the corrected color coordinate value for the remaining components such that a Lab color difference between the input image data to which the first correction value is reflected and the output image data in a Lab color space is minimized when the original color coordinate value of the one component is corrected with the corrected color coordinate value.

In an embodiment, the determining the first correction value may include: determining a minimum frequency as a reference frequency in a variable frequency range of the variable input frame frequency, determining a reference luminance by a luminance of the display panel at the reference frequency, and determining the first correction value based on the reference luminance corresponding to the reference frequency.

In a display device and the method of operating the display device according to the embodiments of the present disclosure, an input image data may be received at a variable input frame frequency, a first correction value for correcting a luminance of a display panel according to the variable input frame frequency may be determined, a second correction value for correcting color coordinate values of components of the input image data to which the first correction value is reflected may be determined, and an output image date obtained by adding the input image data to which the first correction value is reflected and the second correction value may be output. Accordingly, a flicker may be minimized or reduced.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
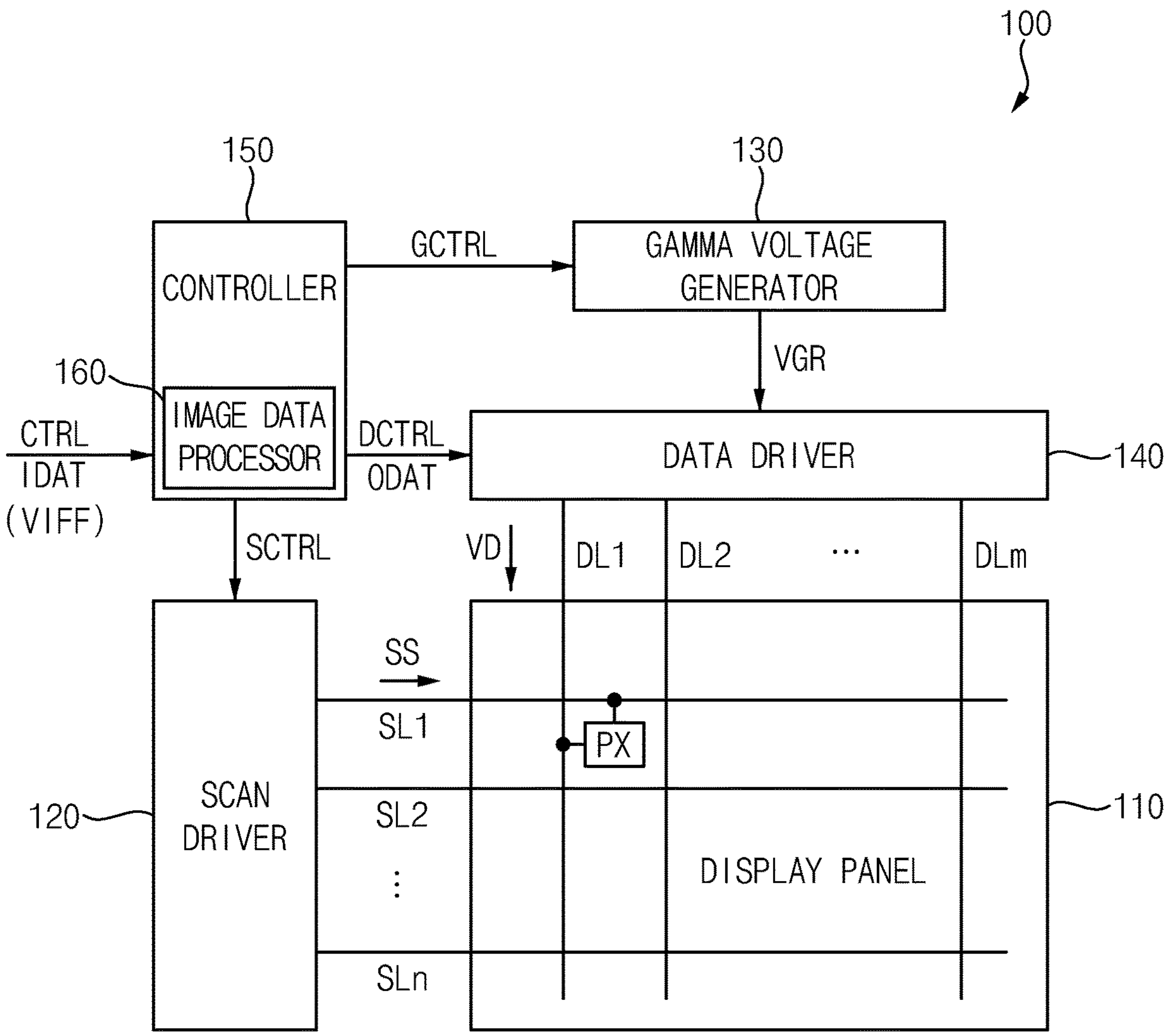
FIG. 1 is a block diagram illustrating a display device according to an embodiment.

Hereinafter, embodiments of the present disclosure will be explained in detail with reference to the accompanying drawings. The same reference numerals are used for the same components in the drawings, and redundant descriptions of the same components will be omitted.

FIG. 1 is a block diagram illustrating a display device according to an embodiment.

Referring to FIG. 1, the display device 100 according to an embodiment of the present disclosure may include a display panel 110 including a plurality of pixels PX, a scan driver 120 that provides a scan signal SS to the plurality of pixels PX, a gamma reference generator 130 that generates a gamma reference voltages VGR, a data driver 140 that provides a data voltage VD to the plurality of pixels PX, and a controller 150 that controls the scan driver 120, the gamma voltage generator 130, and the data driver 140.

The display panel 110 may include a plurality of scan lines SL1 to SLn, a plurality of data lines DL1 to DLm, and a plurality of pixels PX (provided that n and m are integers greater than or equal to 2). Each of the scan lines SL1 to SLn may extend in a first direction (e.g., a row direction), and each of the data lines DL1 to DLm may extend in a second direction (e.g., a column direction) crossing the first direction. The scan lines SL1 to SLn and the data lines DL1 to DLm may be insulated from each other. The plurality of pixels PX may be arranged in a region where the scan lines SL1 to SLn and the data lines DL1 to DLm intersect.

In an embodiment, each of the plurality of pixels PX may include a switching transistor that transmits the data voltage VD in response to the scan signal SS, a storage capacitor that stores the data voltage VD transmitted by the switching transistor, a driving transistor that generates a driving current based on the data voltage VD stored in the storage capacitor, and a light emitting element that emits light based on the driving current generated by the driving transistor. However, the present disclosure is not limited thereto, and the light emitting element may include a light emitting diode (LED), an organic light emitting diode (OLED), a quantum dot (QD) light emitting device, and the like.

The scan driver 120 may provide the scan signals SS to the plurality of pixels PX through the plurality of scan lines SL1 to SLn based on the scan control signal SCTRL received from the controller 150. In an embodiment, the scan driver 120 may sequentially provide the scan signals SS to the plurality of pixels PX in row units. In addition, the scan control signal SCTRL may include a scan start signal, a scan clock signal, and the like, but is not limited thereto. For example, the scan driver 120 may be integrated or formed on the periphery of the display panel 110. Alternatively, the scan driver 120 may be implemented with one or more integrated circuits (IC).

The gamma voltage generator 130 may be controlled by a gamma control signal GCTRL from the controller 150 to generate one or more gamma reference voltages VGR. In an embodiment, the gamma control signal GCTRL may indicate voltage levels of the gamma reference voltages VGR, and the gamma voltage generator 130 may be generate gamma reference voltages VGR corresponding to the voltage levels indicated by the gamma control signal GCTRL. For example, the gamma voltage generator 130 may be included in the data driver 140. Alternatively, the gamma voltage generator 130 may be located outside the data driver 140.

The data driver 140 may receive a data control signal DCTRL and an output image data ODAT from the controller 150, may receive the gamma reference voltages VGR from the gamma voltage generator 130, and may provide the data voltage VD to the plurality of pixels PX through the plurality of data line DL1 to DLm based on the data control signal DCTRL, the output image data ODAT, and the gamma reference voltages VGR. In an embodiment, the data driver 140 may generate respective grayscale voltages corresponding to each grayscale level based on the gamma reference voltages VGR, may select grayscale voltages corresponding to the output image data ODAT from among the grayscale voltages, and may provide the selected grayscale voltages as data voltages VD to the plurality of pixels PX. In addition, the data control signal DCTRL may include an output data enable signal, a horizontal start signal, a load signal, and the like, but is not limited thereto. For example, the data driver 140 may be implemented as a single integrated circuit, and the integrated circuit may be referred to as a timing controller embedded data driver (TED). Alternatively, the data driver 140 may be implemented as separate integrated circuits.

The controller 150 may receive the input image data IDAT and the control signal CTRL from an external host processor. For example, the controller 150 may be a timing controller, and the host processor may be an application processor (AP), a graphic processing unit (GPU), or a graphic card. In an embodiment, the input image data IDAT may be a RGB image data including red image data, green image data, and blue image data. In addition, the control signal CTRL may include a vertical synchronization signal, a horizontal synchronization signal, an input data enable signal, a master clock signal, and the like, but is not limited thereto. The controller 150 may generate the scan control signal SCTRL, the gamma control signal GCTRL, the data control signal DCTRL, and the output image data ODAT based on the input image data IDAT and the control signal CTRL. The controller 150 may control the operation of the scan driver 120 by providing the scan control signal SCTRL to the scan driver 120, the operation of the gamma voltage generator 130 by providing the gamma control signal GCTRL to the gamma voltage generator 130, the operation of the data driver 140 by providing the output image data ODAT and the data control signal DCTRL to the data driver 140.

The host processor may provide the input image data IDAT to the display device 100 at a variable input frame frequency (VIFF) (or variable frame rate) by changing a time length of a blank period for every frame period, and the controller 150 may receive the input image data IDAT from the host processor at the variable input frame frequency VIFF. In an embodiment, the variable input frame frequency VIFF may be varied within a variable frequency range from a predetermined minimum frequency to a predetermined maximum frequency. For example, the minimum frequency may be about 48 Hz, the maximum frequency may be about 240 Hz, and the variable frequency range of the variable input frame frequency (VIFF) may be about 48 Hz to about 240 Hz, but is not limited thereto.

The controller 150 may control the data driver 140 and the scan driver 130 to drive the display panel 110 at the variable input frequency (VIFF). In an embodiment, a mode of the display device 100 in which the display panel 110 is driven at the variable input frame frequency VIFF may be referred to as a variable frame mode. For example, the variable frame mode may be a free-sync mode, a mouse-sync mode, a Q-sync mode, or the like, but is not limited thereto.

In an embodiment, the controller 150 may include an image data processor 160. The image data processor 160 may receive the input image data IDAT at the variable input frequency VIFF. The image data processor 160 may perform a luminance correction of the display panel 110. In addition, the image data processor 160 may perform a color correction of the input image data IDAT. Alternatively, the image data processor 160 may be located an outside the controller 150.

Figure 2:
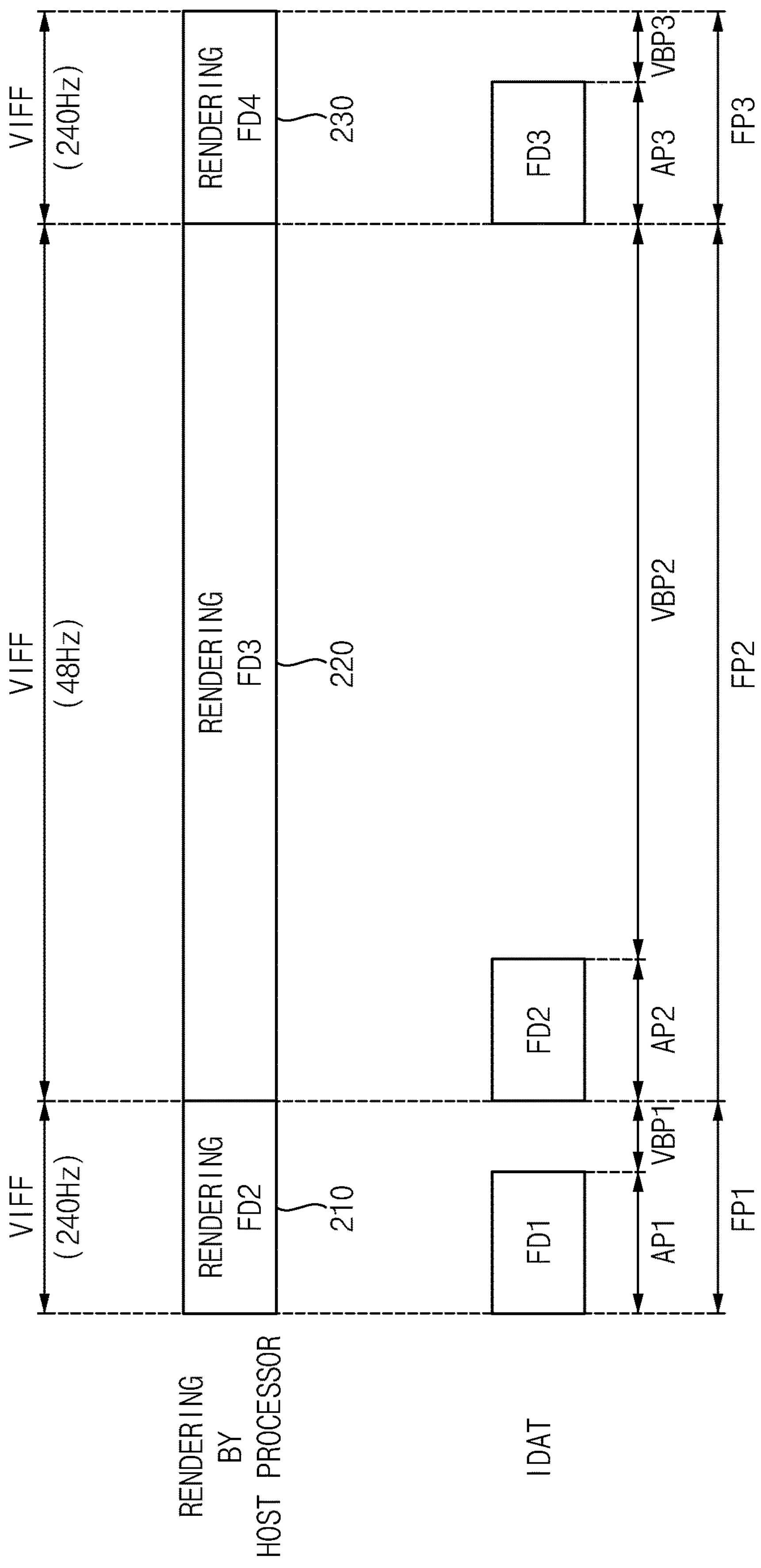
FIG. 2 is a timing diagram illustrating an example of input image data input to the display device of FIG. 1 at a variable input frame frequency.

FIG. 2 is a timing diagram illustrating an example of input image data input to the display device of FIG. 1 at a variable input frame frequency.

Referring to FIGS. 1 and 2, a period or frequency of renderings 210, 220, and 230 of the host processor may not be constant, and the host processor may provide the input image data IDAT (that is, frame data FD1, FD2, and FD3) to the display device 100 in synchronization with a non-uniform period or frequency of the renderings 210, 220, and 230 in the variable frame mode. That is, in the variable frame mode, each frame period FP1, FP2, and FP3 has a constant active period AP1, AP2, and AP3 having a constant time length, but the host processor may provide frame data with the variable frame frequency VIFF to the display device 100 by changing a time length of the variable blank period VBP1, VBP2, and VBP3 of each frame period FP1, FP2, and FP3.

In the first frame period FP1, the second frame data FD2 may be rendered 210 at a frequency of about 240 Hz, and at the same time, the host processor may provide previously rendered the first frame data FD1 at the variable input frame frequency VIFF of about 240 Hz to the display device 100. In addition, the host processor may output the second frame data FD2 during the active period AP2 of the second frame period FP2 and may continue the variable blank period VBP2 of the second frame period FP2 until the rendering 200 of the third frame data FD3 is completed. Accordingly, when the third frame data FD3 is rendered 220 at a frequency of about 48 Hz in the second frame period FP2, the host processor may provide the second frame data FD2 at the variable input frame frequency VIFF of about 48 Hz by increasing the time of the variable blank period VBP2 of the second frame period FP2 in the display device 100. When the fourth frame data FD4 is again rendered 230 with a frequency of about 240 Hz in the third frame period FP3, the host processor may provide the third frame data FD3 back to the display device 100 at the variable input frame frequency VIFF of about 240 Hz.

That is, in the variable frame mode, each of the frame periods FP1, FP2, and FP3 may include the active periods AP1, AP2, and AP3 having a constant time length regardless of the variable input frame frequency VIFF and the variable blank periods VBP1, VBP2, and VBP3 having a variable time length corresponding to the variable input frame frequency VIFF. For example, in the variable frame mode, as the variable input frame frequency VIFF decreases, the time of the variable blank periods VBP1, VBP2, and VBP3 may increase. In the variable frame mode, the controller 150 may output the input image data IDAT received at the variable input frame frequency VIFF as the output image data ODAT to the data driver 140 at a driving frequency substantially equal to the variable input frame frequency VIFF. Accordingly, the display device 100 supporting the variable frame mode may display an image in synchronization with the variable input frame frequency VIFF, thereby preventing a tearing phenomenon caused by frame frequency mismatch.

However, when the luminance correction according to the variable input frame frequency VIFF, that is, the driving frequency of the display panel 110 is not performed in the variable frame mode, the luminance of the display panel 110 may be changed according to the variable input frame frequency VIFF, that is, the driving frequency of the display panel 100. For example, when the luminance correction according to the variable input frame frequency VIFF is not performed in the variable frame mode, the number of times each pixel PX of the display panel 110 driven at a first driving frequency is initialized may be different from the number of times the display panel 110 driven at a second driving frequency different from the first driving frequency is initialized during the same time period. Accordingly, the luminance of the display panel 110 driven at the first driving frequency may be different from the luminance of the display panel 110 driven at the second driving frequency.

Figure 3:
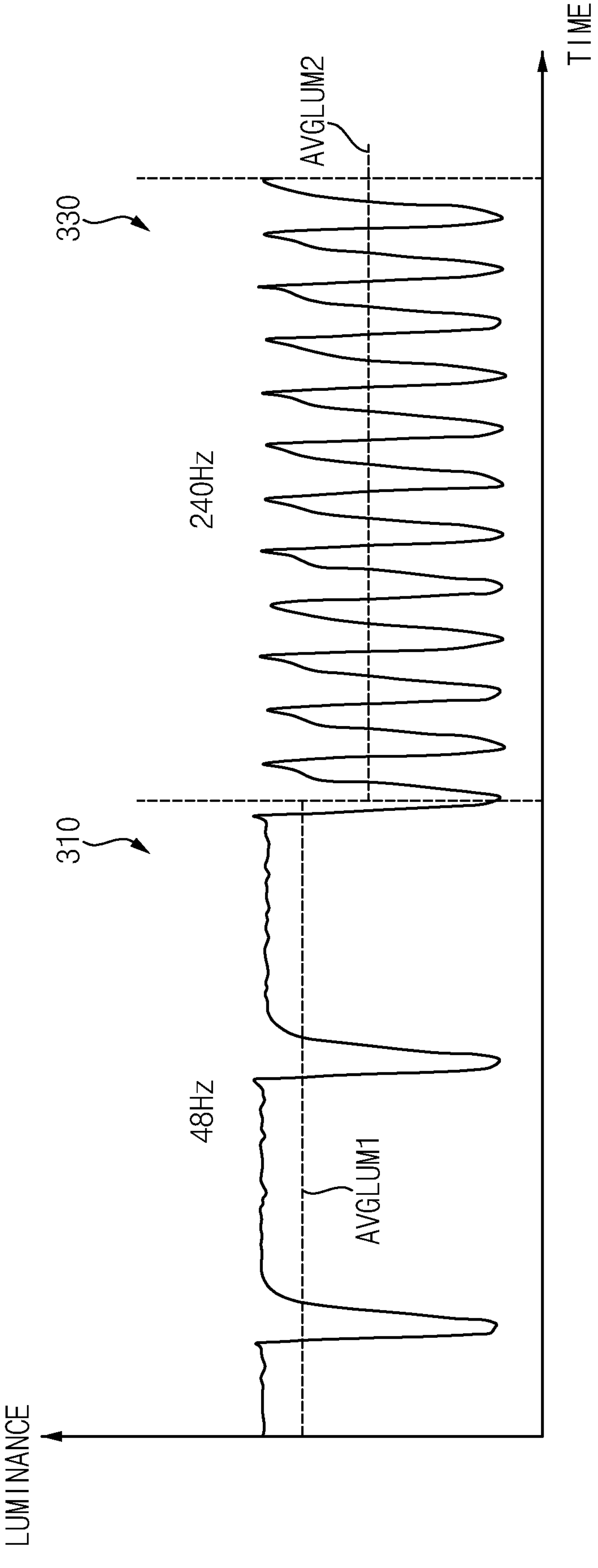
FIG. 3 is a diagram illustrating an example of the luminance of a display panel driven at different frame frequencies when luminance correction is not performed.

FIG. 3 is a diagram illustrating an example of the luminance of a display panel driven at different frame frequencies when luminance correction is not performed.

For example, FIG. 3 shows an example of the luminance 310 of the display panel 110 driven at a first driving frequency of about 48 Hz and an example of the luminance 330 of the display panel 110 driven at second driving frequency of about 240 Hz in the variable frame mode.

Referring to FIGS. 1 and 3, when the luminance correction according to the variable input frame frequency VIFF is not performed, for the same time (e.g., about 53 ms), each pixel PX of the display panel 100 driven at the first driving frequency of about 48 Hz may be initialized about 2.5 times and each pixel PX of the display panel 100 driven at the second driving frequency of about 240 Hz may be turned off about 13 times. Accordingly, an average luminance AVGLUM2 of the display panel 110 driven with the second driving frequency of about 240 Hz may be lower than an average luminance AVGLUM1 of the display panel 110 driven with the first driving frequency of about 48 Hz.

The display device 100 may perform the luminance correction according to the variable input frame frequency VIFF to remove or reduce the difference in luminance of the display panel 110 according to the variable input frame frequency VIFF, that is, the driving frequency of the display panel 110.

Figure 4:
FIG. 4 is a diagram illustrating an example of the luminance of a display panel when luminance correction is not performed and an example of the luminance of a display panel when luminance correction is performed.

FIG. 4 is a diagram illustrating an example of the luminance of a display panel when luminance correction is not performed (350) and an example of the luminance of a display panel when luminance correction is performed (370).

Referring to FIGS. 1 and 4, when the luminance correction is not performed 350, the luminance of the display panel 110 driven at the variable input frame frequency VIFF of about 240 Hz may be different from the luminance of the display panel 110 driven with the variable input frame frequency VIFF of about 120 Hz. However, when the luminance correction is performed 370, the luminance of the display panel 110 driven at a variable input frame frequency VIFF of about 240 Hz and the luminance of the display panel 110 driven with the variable input frame frequency VIFF of about 120 Hz may be similar to each other.

In order to perform the luminance correction, in an embodiment, the display device 100 may determine the minimum frequency in the variable frequency range of the variable input frame frequency VIFF as a reference frequency, may determine the luminance of the display panel 110 at the reference frequency as a reference luminance, and may perform the luminance correction based on the reference luminance corresponding to the reference frequency.

Figure 5:
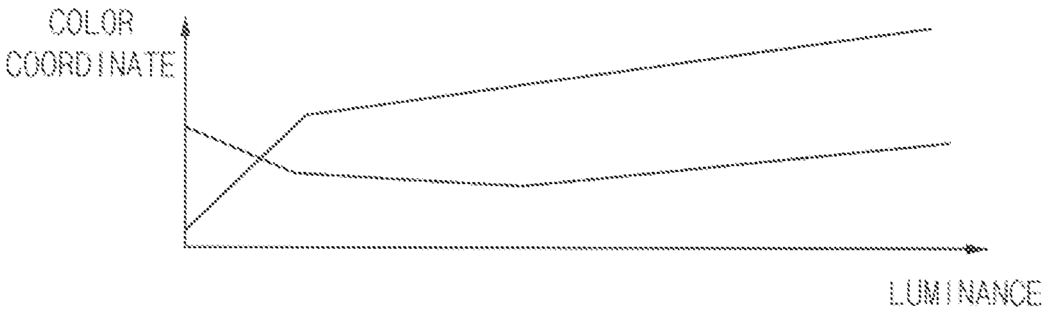
FIG. 5 is a diagram illustrating an example of a color coordinate value according to the luminance of a display panel.

FIG. 5 is a diagram illustrating an example of a color coordinate value according to the luminance of a display panel.

Referring to FIGS. 1 and 5, a color coordinate value may vary according to the luminance of the display panel 110. For example, the color coordinate value may vary according to the luminance of the display panel 110 in a low luminance region having a luminance range of about 0.5 nit or less. That is, when the luminance correction is performed, the color coordinate value may change according to the luminance of the display panel 110 in the low luminance region. In addition, even when the luminance is the same, the color coordinate value change may occur. In this case, the color coordinate value change may be recognized as the flicker.

Accordingly, in the display device 100 according to an embodiment of the present disclosure, the image data processor 160 of the controller 150 may perform the luminance correction and the color correction. That is, the image data processor 160 of the controller 150 may determine a first correction value for correcting a luminance of the display panel 110 according to the variable input frame frequency VIFF, may determine a second correction value for correcting color coordinate values for components of the input image date IDAT to which the first correction value is reflected, and may output the output image date ODAT obtained by adding the input image data IDAT to which the first correction value is reflected and the second correction value. Accordingly, the flicker when the variable input frame frequency VIFF is changed can be minimized or reduced.

In another embodiment, the image data processor 160 of the controller 150 may determine the first correction value for correcting a luminance of the display panel 110 according to the variable input frame frequency VIFF, may determine whether the luminance of the display panel 110 falls in any luminance range of a first luminance range and a second luminance range, may determine the second correction value for correcting color coordinate values of RGB components of the input image data IDAT to which the first correction value is reflected when the luminance of the display panel 110 falls in the first luminance range, and may output the output image date ODAT obtained by adding the input image data IDAT to which the first correction value is reflected and the second correction value. In this case, the image data processor 160 of the controller 150 may determine the output image data ODAT obtained by adding the input image data IDAT and the first correction value when the luminance of the display panel 110 falls within the second luminance. For example, the first luminance range may be from about 0.5 nit to about 4.5 nit, and the second luminance range may be less than about 0.5 nit and greater than about 4.5 nit.

Figure 6:
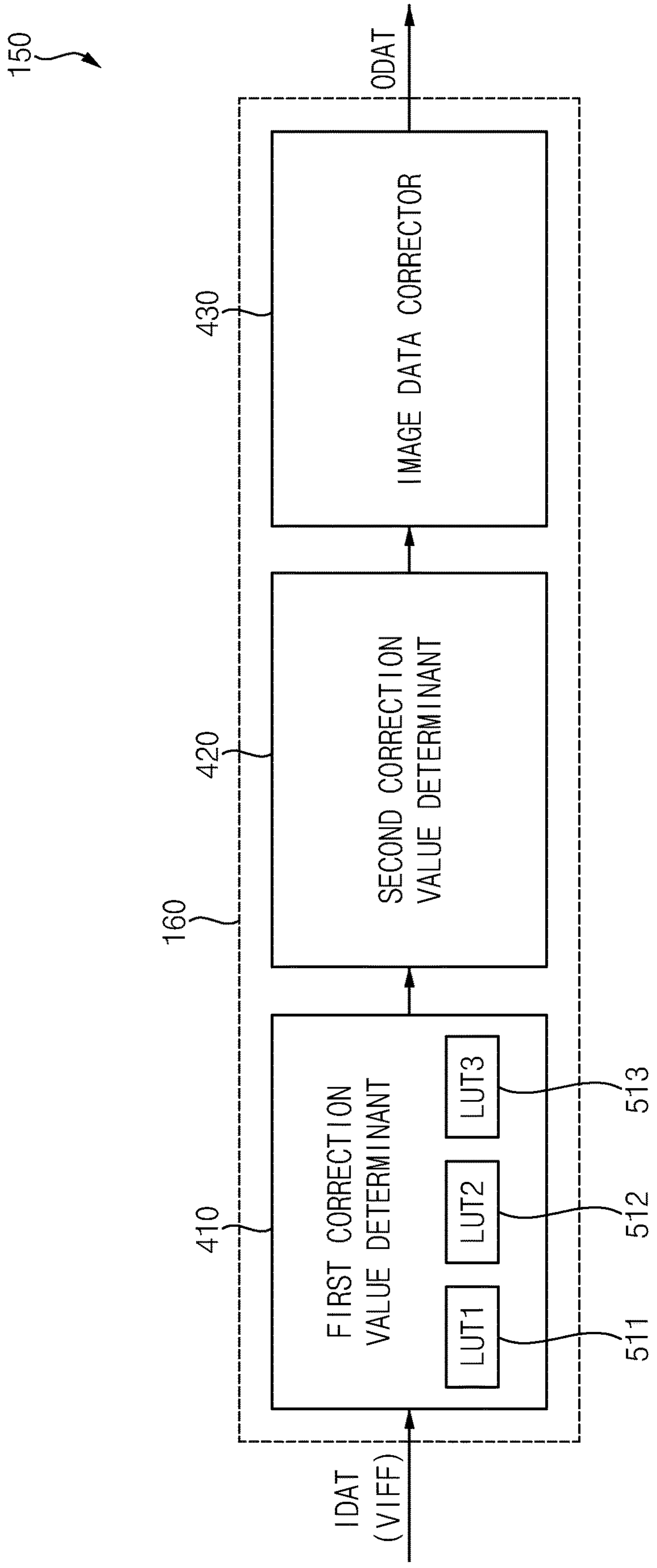
FIG. 6 is a block diagram illustrating the image data processor of FIG. 1.

FIG. 6 is a block diagram illustrating the image data processor of FIG. 1.

Referring to FIGS. 1 and 6, the image data processor 160 of the controller 150 may include a first correction value determiner 410, a second correction value determiner 420, and an image data corrector 430.

The first correction value determiner 410 may include a first lookup table 511, a second lookup table 512, and a third lookup table 513. Each of the first lookup table 511, the second lookup table 512, and the third lookup table 513 may respectively correspond to the variable input frame frequency VIFF and store the different first correction values. For example, the first lookup table 511 may correspond to the variable input frame frequency VIFF of about 144 Hz, the second lookup table 512 may correspond to the variable input frame frequency VIFF of about 120 Hz, and the third lookup table 513 may correspond to the variable input frame frequency VIFF of about 48 Hz.

The first correction value determiner 410 may select one lookup table corresponding to the variable input frame frequency VIFF from among the first lookup table 511, the second lookup table 512, and the third lookup table 513. The first correction value determiner 410 may determine the first correction value for correcting the input image data IDAT by referring to the selected lookup table. The first correction value may be reflected in the input image data IDAT.

The second correction value determiner 420 may determine the second correction value for correcting the color coordinate value of the input image data IDAT to which the first correction value is reflected. That is, the second correction value determiner 420 may determine the degree of color correction of the input image data IDAT to which the first correction value is reflected.

Firstly, the second correction value determiner 420 may determine a color coordinate value corrected for any one of the RGB components of the input image data IDAT to which the first correction value is reflected.

Hereinafter, it will be described that the second correction value determiner 420 first determines the color coordinate values corrected for the B component, but the present disclosure is not limited thereto. For example, the present disclosure can be applied to a case in which color coordinate values corrected for an R component or a G component are first determined.

The second correction value determiner 420 may determine the corrected color coordinate values of the remaining components based on the corrected color coordinate values of the B component. Hereinafter, a method of determining the corrected color coordinate values of other components (e.g., the R component and the G component) based on the predetermined corrected color coordinate values of any one component (e.g., the B component) will be described below in detail.

The second correction value determiner 420 may correct the color coordinate values of the other components in response to a correction ratio of the corrected color coordinate values for any one component. If the color coordinate values of the original RGB components are $R_o$, $G_o$, and $B_o$, and the ratio of the corrected color coordinate values to the original color coordinate values of the B component is $I_{reduce}$(%), the corrected color coordinates values of $R_r$, $G_r$, and $B_r$ for the corrected RGB components are expressed in Equation 1 below.

$$\begin{bmatrix} R_r \\ G_r \\ B_r \end{bmatrix} = \begin{bmatrix} R_0 \\ G_0 \\ B_0 \end{bmatrix} \times \left(1 - \frac{I_{reduce}}{100}\right) \quad \text{[Equation 1]}$$

The second correction value determiner 420 may determine the corrected color coordinate values of other components by using a color space conversion. In an embodiment, the second correction value determiner 420 may convert the RGB color coordinate values of the input image data IDAT into color coordinate values of a Lab color space. The Lab color space may be divided into coordinate values for the "L" component, the "a" component, and the "b" component. The "L" component may represent the brightness of a color (e.g., 0 is black, 100 is white). The "a" component is chromaticity, and a positive number may indicate red and a negative number may indicate green. The "b" component is chromaticity, and a positive number may represent blue and a negative number may represent yellow.

The second correction value determiner 420 may convert the RGB color coordinate values into the color coordinate values of the XYZ color space through Equation 2 below using a preset transformation matrix M. The converted color coordinate values of the XYZ color space may be converted back into color coordinate values of the Lab color space according to Equation 3 below. In Equation 3 below, $X_n$=95.074, $Y_n$=100.000, and $Z_n$=108.883.

$$\begin{bmatrix} X \\ Y \\ Z \end{bmatrix} = M \begin{bmatrix} R \\ G \\ B \end{bmatrix} = \begin{bmatrix} 0.4125 & 0.3576 & 0.1804 \\ 0.2127 & 0.7152 & 0.0722 \\ 0.0193 & 0.1192 & 0.9503 \end{bmatrix} \begin{bmatrix} R \\ G \\ B \end{bmatrix} \quad \text{[Equation 2]}$$

$$L = 100\left(\frac{Y}{Y_n}\right)^{1/3} \quad \text{[Equation 3]}$$

$$a = 500\left[\left(\frac{X}{X_n}\right)^{1/3} - \left(\frac{Y}{Y_n}\right)^{1/3}\right]$$

$$b = 200\left[\left(\frac{Y}{Y_n}\right)^{1/3} - \left(\frac{Z}{Z_n}\right)^{1/3}\right]$$

The second correction value determiner 420 may determine the color coordinate values of the other components such that the Lab color difference between the input image data IDAT to which the first correction value is reflected and the output image data, that is, the distance between the Lab color coordinates is minimized based on the corrected color coordinate value of the "B" component. The Lab color difference may be defined as in Equation 4 below. In Equation 4 below, W is the color difference, $L_o$, $a_o$, and $b_o$ are Lab color coordinate values for the input image data IDAT to which the first correction value is reflected, and $L_r$, $a_r$, and $b_r$ are Lab color coordinate values for the output image data ODAT.

$$W=\sqrt{|L_o-L_r|^2+|a_o-a_r|^2+|b_o-b_r|^2}$$

Referring to the Equation 2, since the "Z" component in the XYZ color space is determined by 0.0193R+0.1192G+0.9503B, the "Z" component may be approximated to the "B" component in the RGB color space. The second correction value determiner 420 may determine a fixed value by approximating the Z value based on the predetermined corrected color coordinate value of the B component.

When the Z value is fixed, the second correction value determiner 420 may determine the X and Y values to minimize the color difference between the input image data IDAT to which the first correction value is reflected and the output image data ODAT. From the Equation 4, the X and Y values may be determined by Equations 5 and 6 below. In Equations 5 and 6, $X_o$, $Y_o$, and $Z_o$ are XYZ color coordinate values for the input image data IDAT to which the first correction value is reflected, and $X_r$, $Y_r$, and $Z_r$ are XYZ color coordinate values for the output image data ODAT. Here, the $Z_r$ is a predetermined value based on the corrected color coordinate value of the "B" component as described above.

$$X_r = \left[\left(\frac{X_n}{Z_n}\right)^{1/3} \frac{200^2}{100^2+200^2}\left(Z_r^{1/3} - Z_0^{1/3}\right) + X_0^{1/3}\right]^3 \quad \text{[Equation 5]}$$

$$Y_r = \left[\left(\frac{Y_n}{Z_n}\right)^{1/3} \frac{200^2}{100^2+200^2}\left(Z_r^{1/3} - Z_0^{1/3}\right) + Y_0^{1/3}\right]^3 \quad \text{[Equation 6]}$$

The second correction value determiner 420 may determine the corrected color coordinate values of the RGB components by inversely calculating the Equation 2 based on $X_r$, $Y_r$, and predetermined $Z_r$ values determined by the Equations 5 and 6. The RGB color coordinate values inversely calculated from the $X_r$, $Y_r$, and $Z_r$ values may be expressed as in Equation 7 below. Here, R', G', and B' are color coordinate values of the finally corrected RGB components.

$$\begin{bmatrix} R' \\ G' \\ B' \end{bmatrix} = B \begin{bmatrix} 3.2405 & -1.5371 & -0.4985 \\ -0.9693 & 1.8760 & 0.0416 \\ 0.0556 & -0.2040 & 1.0572 \end{bmatrix} \begin{bmatrix} X_r \\ Y_r \\ Z_r \end{bmatrix} \quad \text{[Equation 7]}$$

The corrected color coordinate value of the "B" component determined by the Equation 7 may be different from the predetermined corrected color coordinate value of the "B" component, but an error therebetween may not be large. Accordingly, the second correction value determiner 420 may select the predetermined corrected color coordinate value of the "B" component or may select the corrected color coordinate value of the "B" component determined by the Equation 7.

In the above, an example has been described in which the second correction value determiner 420 uses the Lab color space conversion, but the present disclosure is not limited thereto. For example, the second correction value determiner 420 may use conversion into various color spaces such as an u'v' color space, a CIE2001 color space, or the like.

The image data corrector 430 may correct the input image data IDAT to which the first correction value is reflected by applying the corrected color coordinate values (i.e., the second correction value) of the RGB components determined by the second correction value determiner 420. The image data corrector 430 may output the output image date ODAT obtained by adding the input image data IDAT to which the first correction value is reflected and the second correction value.

Figure 7:
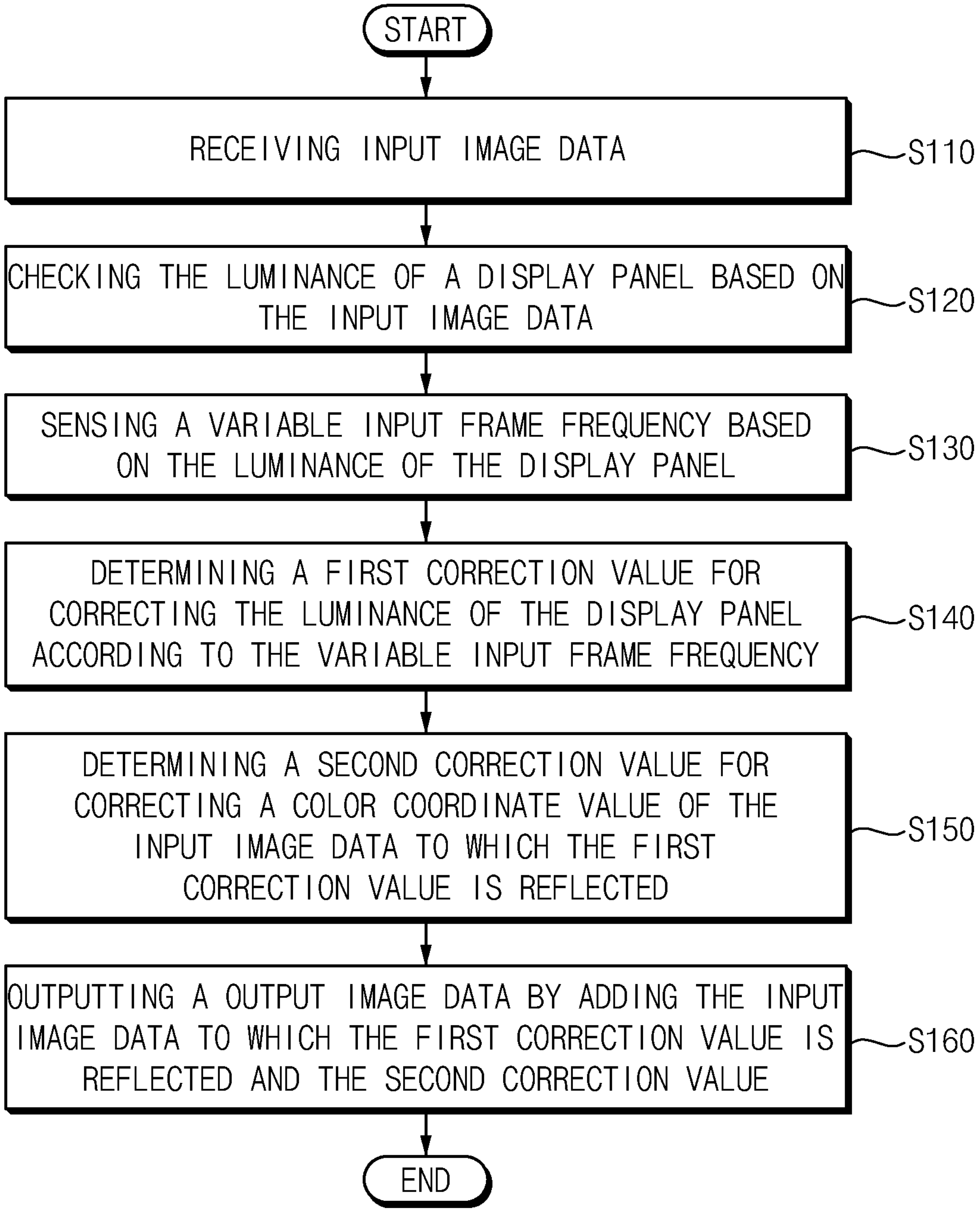
FIG. 7 is a flowchart illustrating a method of driving a display device according to an embodiment.

FIG. 7 is a flowchart illustrating a method of driving a display device according to an embodiment.

Referring to FIGS. 1, 6, and 7, the image data processor 160 of the controller 150 may receive the input image data IDAT at the variable input frame frequency VIFF (S110).

The controller 150 may check the luminance of the display panel 110 based on the input image data IDAT (S120).

The controller 150 may sense the variable input frame frequency VIFF based on the luminance of the display panel 110 (S130). That is, after the luminance of the display panel 110 is checked, the variable input frame frequency VIFF may be sensed based on the checked luminance of the display panel 110.

The image data processor 160 of the controller 150 may determine the first correction value for correcting the luminance of the display panel 110 according to the variable input frame frequency VIFF (S140). Specifically, the image data processor 160 of the controller 150 may determine the minimum frequency in the variable frequency range of the variable input frame frequency VIFF as the reference frequency, may determine the reference luminance as the luminance of the display panel 110 at the reference frequency, and may determine the first correction value based on the reference luminance corresponding to the reference frequency.

The image data processor 160 of the controller 150 may determine the second correction value for correcting the color coordinate values of the RGB components of the input image data IDAT to which the first correction value is reflected (S150). A detailed description of the method of determining the second correction value is the same as described above. Lastly, the image data processor 160 of the controller 150 may output the output image date ODAT obtained by adding the input image data IDAT to which the first correction value is reflected and the second correction value (S160).

Figure 8:
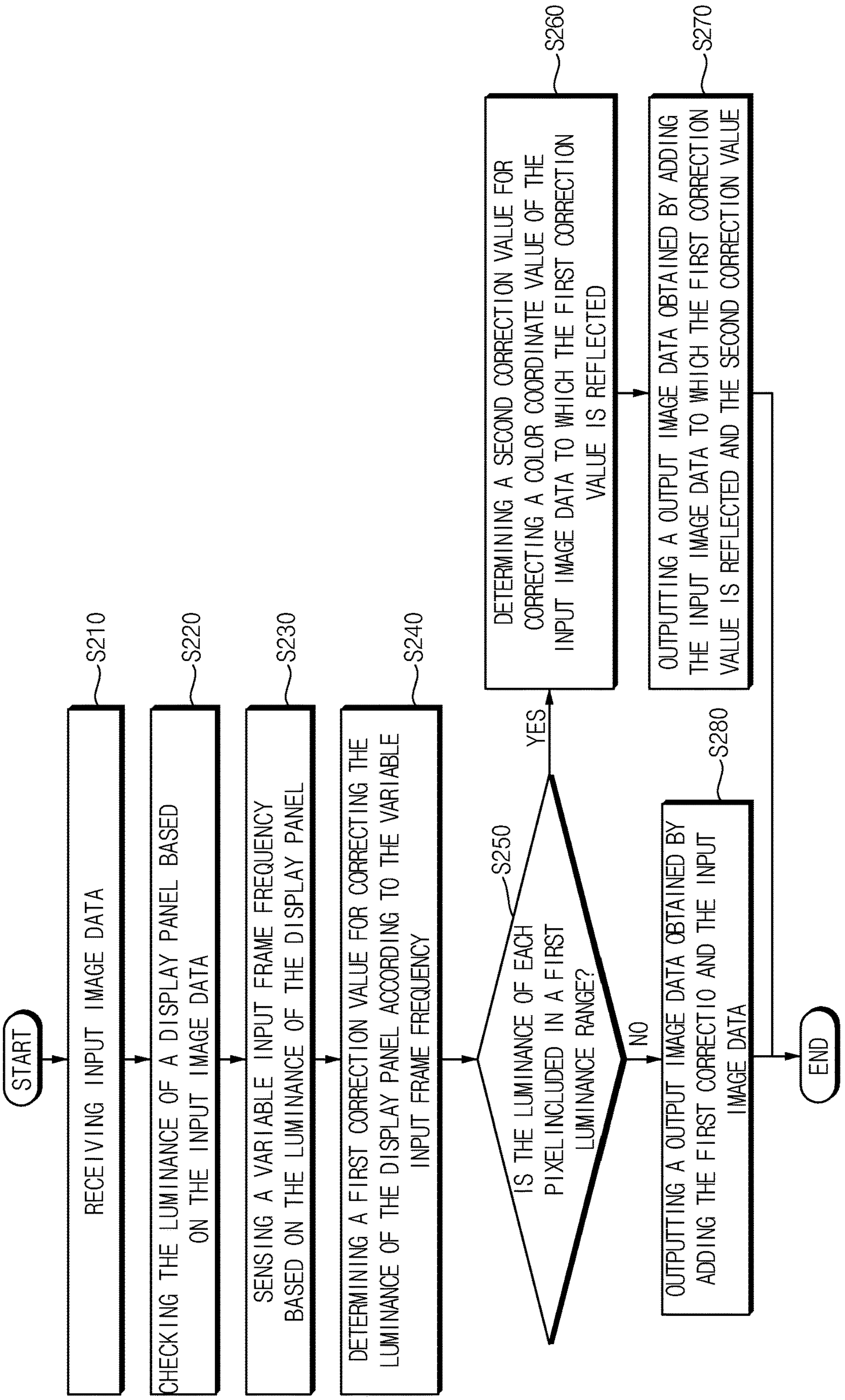
FIG. 8 is a flowchart illustrating a method of driving a display device according to another embodiment.

FIG. 8 is a flowchart illustrating a method of driving a display device according to another embodiment. Hereinafter, a configuration that is the same as or similar to the driving method of the display device 100 described with reference to FIG. 8 will be omitted or briefly described.

Referring to FIGS. 1, 6, and 8, the image data processor 160 of the controller 150 may receive input image data IDAT at the variable input frame frequency VIFF (S210). The controller 150 may check the luminance of the display panel 110 based on the input image data IDAT (S220). The controller 150 may sense the variable input frame frequency VIFF based on the luminance of the display panel 110 (S230). The image data processor 160 of the controller 150 may determine the first correction value for correcting the luminance of the display panel 110 according to the variable input frame frequency VIFF (S240).

The image data processor 160 of the controller 150 may determine whether the luminance of the display panel 110 is within the first luminance range (S250). Specifically, for each pixel PX of the display panel 110, the image data processor 160 of the controller 150 may determine whether the luminance of the display panel 110 is within any luminance range of the first luminance range and the second luminance range. For example, the first luminance range may be from about 0.5 nit to about 4.5 nit, and the second luminance range may be less than about 0.5 nit and greater than about 4.5 nit.

In an embodiment, when the luminance of the display panel 110 is within the first luminance range, the image data processor 160 of the controller 150 may determine the second correction value for correcting color coordinate values of the RGB components of the input image data IDAT to which the first correction value is reflected (S260). Thereafter, the image data processor 160 of the controller 150 may output the output image date ODAT obtained by adding the input image data IDAT to which the first correction value is reflected and the second correction value (S270).

In another embodiment, when the luminance of the display panel 110 is within the second luminance range, the image data processor 160 of the controller 150 may output the output image date ODAT obtained by adding the input image data IDAT and the first correction value (S280). That is, the image data processor 160 of the controller 150 may not perform color correction on the input image data IDAT.

Figure 9:
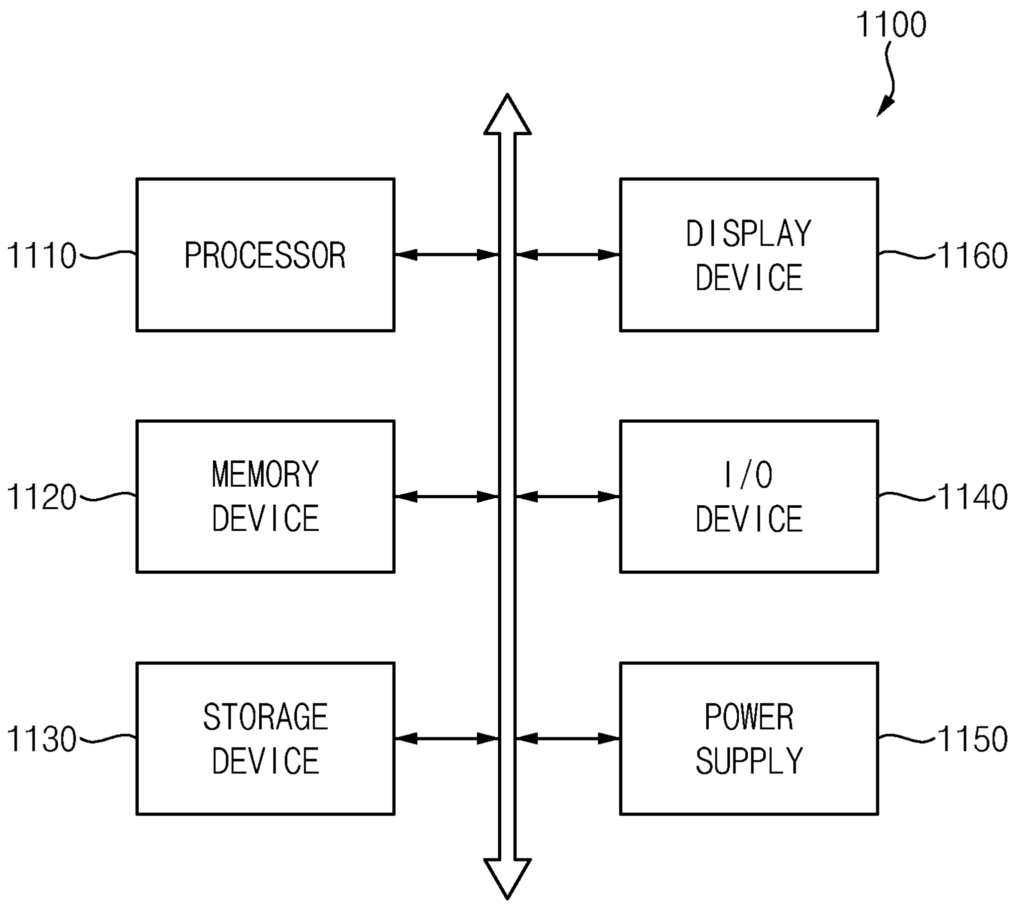
FIG. 9 is a block diagram illustrating an electronic device including the display device of FIG. 1.

FIG. 9 is a block diagram illustrating an electronic device including the display device of FIG. 1. For example, the display device 1160 shown in FIG. 9 may correspond to the display device 100 shown in FIG. 1.

Referring to FIG. 9, the electronic device 1100 may include a processor 1110, a memory device 1120, a storage device 1130, an input/output (I/O) device 1140, a power supply 1150, and the display device 1160. The electronic device 1100 may further include a plurality of ports for communicating with a video card, a sound card, a memory card, a universal serial bus (USB) device, other electronic devices, and the like.

The processor 1110 may perform various computing functions or tasks. The processor 1110 may be an application processor (AP), a microprocessor, a central processing unit (CPU), etc. The processor 1110 may be coupled to other components via an address bus, a control bus, a data bus, etc. Further, in some embodiments, the processor 1110 may be further coupled to an extended bus such as a peripheral component interconnection (PCI) bus.

The memory device 1120 may store data for operations of the electronic device 1100. For example, the memory device 1120 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, and the like, and/or at least one volatile memory device such as a dynamic random access memory (DRAM) device, a static random access memory (SRAM) device, a mobile dynamic random access memory (mobile DRAM) device, and the like.

The storage device 1130 may be a solid state drive (SSD) device, a hard disk drive (HDD) device, a CD-ROM device, etc. The I/O device 1140 may be an input device such as a keyboard, a keypad, a mouse, a touch screen, and the like, and an output device such as a printer, a speaker, and the like. The power supply 1150 may supply power for operations of the electronic device 1100. The display device 1160 may be coupled to other components through the buses or other communication links.

In an embodiment, the electronic device 1100 may be nay electronic device including the display device 160 such as a smart phone, a mobile phone, a tablet computer, a digital TV, a 3D TV, a personal computer (PC), a home electronic device, a laptop computer, a personal digital assistants (PDA), a portable multimedia player (PMPs), a digital camera, a music player, a portable game console, a navigation, and the like.

The present disclosure can be applied to various display devices. For example, the present disclosure is applicable to various display devices such as display devices for vehicles, ships and aircraft, portable communication devices, display devices for exhibition or information transmission, medical display devices, and the like.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present disclosure as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel including a plurality of pixels, each of the plurality of pixels connected to a plurality of scan lines and a plurality of data lines, respectively;

a scan driver configured to provide scan signals to the pixels through the scan lines;

a data driver configured to provide data voltages to the pixels through the data lines; and a controller configured to control the scan driver and the data driver and including an image data processor configured to receive input image data at variable input frame frequency, wherein the image data processor is further configured to:

determine a first correction value for correcting a luminance of the display panel according to the variable input frame frequency;

determine a second correction value for correcting color coordinate values for components of the input image data to which the first correction value is reflected; and output an output image data obtained by adding the input image data to which the first correction value is reflected and the second correction value.

2. The display device of claim 1, wherein the image data processor is further configured to:

determine a corrected color coordinate value for any one of the components;

determine corrected color coordinate values for remaining components in response to the corrected color coordinate value for the one component; and determine the second correction value based on the corrected color coordinate values for the one component and the remaining components.

3. The display device of claim 2, wherein the image data processor is further configured to:

determine the corrected color coordinate value for the remaining components by applying a correction ratio for the one component to an original color coordinate value for the remaining components.

4. The display device of claim 2, wherein the image data processor is further configured to:

determine the corrected color coordinate value for the remaining components such that a Lab color difference between the input image data to which the first correction value is reflected and the output image data in a Lab color space is minimized when an original color coordinate value of the one component is corrected with the corrected color coordinate value.

5. The display device of claim 1, wherein the image data processor includes:

a first correction value determiner including a plurality of lookup tables for storing a different first correction values and configured to determine the first correction value for correcting the input image data by referring to a lookup table corresponding to the variable input frame frequency among the lookup tables;

a second correction value determiner configured to converts color coordinate values of the input image data, including red input image data, green input image data and blue input image data, to which the first correction value is reflected into color coordinate values of a Lab color space to determine the second correction value; and an image data corrector configured to output the output image data.

6. The display device of claim 1, wherein the image data processor is further configured to:

determine a minimum frequency as a reference frequency in a variable frequency range of the variable input frame frequency;

determine a reference luminance by a luminance of the display panel at the reference frequency; and determine the first correction value based on the reference luminance corresponding to the reference frequency.

7. A display device comprising:

a display panel including a plurality of pixels, each of the plurality of pixels connected to a plurality of scan lines and a plurality of data lines, respectively;

a scan driver configured to provide scan signals to the pixels through the scan lines;

a data driver configured to provide data voltages to the pixels through the data lines; and a controller configured to control the scan driver and the data driver and including an image data processor configured to receive input image data at variable input frame frequency, wherein the image data processor is further configured to:

determine a first correction value for correcting a luminance of the display panel according to the variable input frame frequency;

determine whether the luminance of the display panel is within any luminance range of a first luminance range and a second luminance range;

determine a second correction value for correcting color coordinate values of components of the input image data to which the first correction value is reflected when the luminance of the display panel is within the first luminance range; and output an output image data obtained by adding the input image data to which the first correction value is reflected and the second correction value.

8. The display device of claim 7, wherein the image data processor is further configured to:

determine the output image data obtained by adding the input image data and the first correction value when the luminance of the display panel is within the second luminance.

9. The display device of claim 8, wherein the first luminance range is about 0.5 nit to about 4.5 nit and the second luminance range is less than about 0.5 nit and greater than about 4.5 nit.

10. The display device of claim 7, wherein the image data processor is further configured to:

determine a corrected color coordinate value for any one of the components;

determine corrected color coordinate values for remaining components in response to the corrected color coordinate value for the one component; and determine the second correction value based on the corrected color coordinate values for the one component and the remaining components.

11. The display device of claim 10, wherein the image data processor is further configured to:

determine the corrected color coordinate value for the remaining components by applying a correction ratio for the one component to an original color coordinate value for the remaining components.

12. The display device of claim 10, wherein the image data processor is further configured to:

determine the corrected color coordinate value for the remaining components such that a Lab color difference between the input image data to which the first correction value is reflected and the output image data in a Lab color space is minimized when an original color coordinate value of the one component is corrected with the corrected color coordinate value.

13. The display device of claim 7, wherein the image data processor includes:

a first correction value determiner including a plurality of lookup tables for storing a different first correction values and configured to determine the first correction value for correcting the input image data by referring to a lookup table corresponding to the variable input frame frequency among the lookup tables;

a second correction value determiner configured to converts color coordinate values of the input image data, including red input image data, green input image data and blue input image data, to which the first correction value is reflected into color coordinate values of a Lab color space to determine the second correction value; and an image data corrector configured to output the output image data.

14. The display device of claim 7, wherein the image data processor is further configured to:

determine a minimum frequency as a reference frequency in a variable frequency range of the variable input frame frequency;

determine a reference luminance by a luminance of the display panel at the reference frequency; and determine the first correction value based on the reference luminance corresponding to the reference frequency.

15. A method of operating a display device, the method comprising steps of:

receiving an input image data at a variable input frame frequency;

determining a first correction value for correcting a luminance of a display panel according to the variable input frame frequency;

determining a second correction value for correcting color coordinate values of components of the input image data to which the first correction value is reflected; and outputting an output image data obtained by adding the input image data to which the first correction value is reflected and the second correction value.

16. The method of claim 15, further comprising a step of:

checking a luminance of the display panel based on the input image data after receiving the input image data.

17. The method of claim 15, wherein the determining the second correction value is accomplished by determining a corrected color coordinate value for any one of the components, determining corrected color coordinate values for remaining components in response to the corrected color coordinate value for the one component, and determining the second correction value based on the corrected color coordinate values for the one component and the remaining components.

18. The method of claim 17, wherein the determining corrected color values for the remaining components is accomplished by determining the corrected color coordinate value for the remaining components by applying a correction ratio for the one component to an original color coordinate value for the remaining components.

19. The method of claim 17, wherein the determining corrected color values for the remaining components is accomplished by determining the corrected color coordinate value for the remaining components such that a Lab color difference between the input image data to which the first correction value is reflected and the output image data in a Lab color space is minimized when an original color coordinate value of the one component is corrected with the corrected color coordinate value.

20. The method of claim 15, wherein the determining the first correction value is accomplished by determining a minimum frequency as a reference frequency in a variable frequency range of the variable input frame frequency, determining a reference luminance by a luminance of the display panel at the reference frequency, and determining the first correction value based on the reference luminance corresponding to the reference frequency.

* * * * *